United States Patent
Lee et al.

(10) Patent No.: US 12,147,911 B2
(45) Date of Patent: Nov. 19, 2024

(54) NOVELTY DETECTOR

(71) Applicants: SK hynix Inc., Icheon (KR); Korea Advanced Institute of Science and Technology (KAIST), Daejeon (KR)

(72) Inventors: Jungeon Lee, Daejeon (KR); Chong-Min Kyung, Daejeon (KR)

(73) Assignees: SK hynix Inc.; Korea Advanced Institute of Science and Technology (KAIST)

( * ) Notice: Subject to any disclaimer, the term of this patent is extended or adjusted under 35 U.S.C. 154(b) by 982 days.

(21) Appl. No.: 17/149,627

(22) Filed: Jan. 14, 2021

(65) Prior Publication Data

US 2021/0383253 A1    Dec. 9, 2021

(30) Foreign Application Priority Data

Jun. 8, 2020 (KR) .................. 10-2020-0068807
Dec. 31, 2020 (CN) .................. 202011622881.2

(51) Int. Cl.
G06N 5/04 (2023.01)
G06F 16/23 (2019.01)
G06N 3/08 (2023.01)

(52) U.S. Cl.
CPC ........... *G06N 5/04* (2013.01); *G06F 16/2365* (2019.01); *G06N 3/08* (2013.01)

(58) Field of Classification Search
None
See application file for complete search history.

(56) References Cited

U.S. PATENT DOCUMENTS

| | | | |
|---|---|---|---|
| 10,373,056 | B1 | 8/2019 | Andoni et al. |
| 2016/0253598 | A1 | 9/2016 | Yamada et al. |
| 2019/0199743 | A1 | 6/2019 | La Marca et al. |
| 2019/0287230 | A1 | 9/2019 | Lu et al. |

FOREIGN PATENT DOCUMENTS

| | | |
|---|---|---|
| CN | 109948117 A | 6/2019 |
| CN | 110147323 A | 8/2019 |
| CN | 110705376 A | 1/2020 |
| CN | 110781433 A | 2/2020 |
| CN | 110795585 A | 2/2020 |

OTHER PUBLICATIONS

Y. Yang et al., Network Intrusion Detection Based on Supervised Adversarial Variational Auto-Encoder With Regularization, IEEE Access, vol. 8, 2020, pp. 42169-42184 (Year: 2020).*
Alaverdyan, Unsupervised Representation Learning for Anomaly Detection on Neuroimaging. Application to Epilepsy Lesion Detection on Brain MRI, Medical Imaging, Doctoral Thesis, Université de Lyon, 2019, pp. 1-214 (Year: 2019).*

(Continued)

*Primary Examiner* — Wilbert L Starks

(57) ABSTRACT

A novelty detector incudes a generator configured to output reconstructed data from actual data; and a discriminator configured to receive the actual data as well as the reconstructed data and to produce, using the actual data and the reconstructed data, discrimination data representing whether the actual data is normal or abnormal.

17 Claims, 9 Drawing Sheets

(56) References Cited

OTHER PUBLICATIONS

J. Lee, et al., "Hybrid Discriminator with Correlative Autoencoder for Anomaly Detection," in IEEE Journals and Magazine, 2020.
D. Hendrycks, et al., "Deep anomaly detection with outlier exposure," in International Conference on Learning Representations (ICLR), 2019.
D. Abati, et al., "Latent space autoregression for novelty detection," in IEEE/CVF Conference on Computer Vision and Pattern Recognition (CVPR), 2019.
D. Hendrycks and K. Gimpel, "A baseline for detecting misclassified and out-of-distribution examples in neural networks," in International Conference on Learning Representations (ICLR), 2017.
K. Lee, et al., "Training confidence-calibrated classifiers for detecting out-of-distribution samples, " in International Conference on Learning Representations (ICLR), 2018.
D. Hendrycks, et al., "Using self-supervised learning can improve model robustness and uncertainty," in Advances in Neural Information Processing Systems (NeurIPS), 2019.
D. P. Kingma and P. Dhariwal, "Glow: Generative flow with invertible 1×1 convolutions," in Advances in Neural Information Processing Systems (NeurIPS), 2018.
T. Salimans, et al., "Pixelcnn++: Improving the pixelcnn with discretized logistic mixture likelihood and other modifications," in International Conference on Learning Representations (ICLR), 2017.
D. P. Kingma and M. Welling, "Auto-encoding variational bayes," in International Conference on Learning Representations (ICLR), 2013.
C. M. Bishop, "Novelty detection and neural network validation," in IEE Proceedings—Vision, Image and Signal Processing, 1994.
D. Blei, et al., "Advances in approximate bayesian inference," in Advances in Neural Information Processing Systems (NeurIPS)—Panel Discussion, 2017.
E. Nalisnick, et al., "Do deep generative models know what they don't know?" in International Conference on Learning Representations (ICLR), 2019.
S. Liang, et al., "Enhancing the reliability of out-of-distribution image detection in neural networks," in International Conference on Learning Representations (ICLR), 2018.
S. Mohseni, et al., "Self-supervised learning for generalizable out-of-distribution detection," in AAAI Conference on Artificial Intelligence, 2020.
R. Chalapathy and S. Chawla, "Deep learning for anomaly detection: A survey," in arXiv, 2019.
S. Bulusu, et al., "Anomalous instance detection in deep learning: A survey," in IEEE Symposium on Security and Privacy, 2020.
A. Makhzani, et al., "Adversarial autoencoders," in International Conference on Learning Representations (ICLR)—Workshops, 2016.
P. Luc, et al., "Predicting deeper into the future of semantic segmentation," in IEEE International Conference on Computer Vision (ICCV), 2017.
Y. Yazici, et al., "Autoregressive generative adversarial networks," in International Conference on Learning Representations (ICLR)—Workshops, 2018.
I. J. Goodfellow, et al., "Generative adversarial networks," in Advances in Neural Information Processing Systems (NeurIPS), 2014.
Y. Ganin, et al., "Synthesizing programs for images using reinforced adversarial learning," in International Conference on Machine Learning (ICML), 2018.
R. M. Gray and L. D. Davisson, "An introduction to statistical signal processing," in Cambridge University Press, 2004.
R. Steyer and W. Nagel, "Probability and conditional expectation: Fundamentals for the empirical sciences," in John Wiley & Sons Incorporated, 2017.
A. Alemi, et al., "Uncertainty in the variational information bottleneck," in Conference on Uncertainty in Artificial Intelligence (UAI)—Workshops, 2018.
L. Ruff, et al., "Deep one-class classification," in Proceedings of Machine Learning Research, 2018.
C. You, et al., "Provable self-representation based outlier detection in a union of subspaces," in IEEE/CVF Conference on Computer Vision and Pattern Recognition (CVPR), 2017.
S. Chandar, et al., "Correlational neural networks," in Neural Computation, 2016.
Y. Li and N. Vasconcelos, "Efficient multi-domain learning by covariance normalization," in IEEE/CVF Conference on Computer Vision and Pattern Recognition (CVPR), 2019.
H. Gao, et al., "Low-shot learning via covariance-preserving adversarial augmentation networks," in Advances in Neural Information Processing Systems (NeurIPS), 2018.
W. li, et al., "Distribution consistency based covariance metric networks for few-shot learning," in AAAI Conference on Artificial Intelligence, 2019.
Fu-Hsiang Chan, et al., "Anticipating Accidents in Dashcam Videos." ACCV 2016.
K. Lee, et al., "A simple unified framework for detecting out-of-distribution samples and adversarial attacks," in Advances in Neural Information Processing Systems (NeurIPS), 2018.
H. Choi, et al., "Waic, but why? Generative ensembles for robust anomaly detection," in arXiv, 2019.
J. Ren, et al., "Likelihood ratios for out-of-distribution detection," in Advances in Neural Information Processing Systems (NeurIPS), 2019.
J. Serrà, et al., "Input complexity and out-of-distribution detection with likelihood-based generative models," in International Conference on Learning Representations (ICLR), 2020.
M. Sabokrou, et al., "Adversarially learned one-class classifier for novelty detection," in IEEE/CVF Conference on Computer Vision and Pattern Recognition (CVPR), 2018.
S. Pidhorskyi, et al., "Generative probabilistic novelty detection with adversarial autoencoders," in Advances in Neural Information Processing Systems (NeurIPS), 2018.

* cited by examiner

<Prior Art>

<Prior Art>

<Prior Art>

NOVELTY DETECTOR

CROSS-REFERENCE TO RELATED APPLICATION

The present application claims priority under 35 U.S.C. § 119(a) to Korean Patent Application No. 10-2020-0068807, filed on Jun. 8, 2020, and to Chinese Patent Application No. 2020116228812, filed Dec. 31, 2020, which are incorporated herein by reference in their entirety.

BACKGROUND

1. Technical Field

Various embodiments may relate to a novelty detector, and more specifically, to a novelty detector being trained with various samples without labels.

2. Related Art

Novelty detection refers to a technology that detects data that is not similar to previously known data.

When performing novelty detection using a neural network, a neural network is trained using normal samples. The normal samples may be from the distribution of feature space of normal samples.

When data is input to the neural network after training is complete, the neural network infers whether the actual data is a normal sample (such as a sample from the distribution of the feature space of normal samples) or an abnormal sample (such as a sample not from the distribution of the feature space of normal samples).

FIG. 1 is a block diagram showing a conventional novelty detector 1.

The conventional novelty detector 1 includes a generator 10 and a discriminator 20.

Each of the generator 10 and the discriminator 20 has a neural network structure such as a convolutional neural network (CNN).

The neural network having the structure as shown in FIG. 1 is referred to as a generative adversarial network (GAN).

The generator 10 includes an encoder 11 and a decoder 12 sequentially coupled as shown in FIG. 2 to receive actual data x and generate reconstructed data G(x).

The encoder 11 and decoder 12 may also have a neural network structure such as a CNN.

The discriminator 20 receives the reconstructed data G(x) and outputs discrimination data D indicating whether the actual data x is a normal sample or an abnormal sample.

For example, the discrimination data D may become 0 or 1, where 1 indicates that the actual data is determined as a normal sample, and 0 indicates that the actual data is determined as an abnormal sample.

The conventional novelty detector 1 further includes a coupling circuit 30.

The coupling circuit 30 provides an actual data x or reconstructed data G(x) as an input of the discriminator 20 for a training operation.

The coupling circuit 30 provides the reconstructed data G(x) as an input of the discriminator 20 for an inference operation.

FIG. 3 is a flowchart showing a training operation of the conventional novelty detector 1. The purpose of training the generator 10 is to reconstruct samples that are similar to actual samples, and training the discriminator 20 is to distinguish between the samples generated by generator 10 and actual samples.

In the conventional novelty detector 1, the discriminator 20 and the generator 10 are trained alternately.

When training the discriminator 20 at step S10, weights of a neural network of the discriminator 20 are adjusted while weights of a neural network of the generator 10 are fixed.

At this time, the actual data x and the reconstructed data G(x) are alternately input to the discriminator 20.

At this time, weights of the discriminator 20 are adjusted so that the discrimination data D becomes 1 when the actual data x is input and the discrimination data D becomes 0 when the reconstructed data G(x) is input.

When training the generator 10 at step S20, weights of the generator 10 are adjusted while weights of the discriminator 20 are fixed.

At this time, the reconstructed data G(x) is input to the discriminator 20.

When the reconstructed data G(x) is input, weights of the generator 10 are adjusted so that the discrimination data D becomes 1 and mean square error (MSE) between the actual data x and the reconstructed data G(x) becomes 0.

During the training operation, the above two steps can be performed repeatedly.

When training a neural network, a normal sample labeled with a class may be used.

When a neural network is trained using a normal sample having a label, novelty detection performance may be improved.

However, there is a problem that it takes a lot of time and cost to prepare as many normal samples having class labels as required for an industrial usage.

For this reason, it is common to perform training using various classes of samples without labels. In this case, as the number of classes increases, there is a problem that novelty detection performance is rapidly degraded.

SUMMARY

In accordance with an embodiment of the present disclosure, a novelty detector may include a generator configured to output reconstructed data from actual data; and a discriminator configured to receive the actual data and the reconstructed data and to produce, using the actual data and the reconstructed data, discrimination data representing whether the actual data is normal or abnormal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty detector, and explain various principles and advantages of those embodiments.

DETAILED DESCRIPTION

Various embodiments will be described below with reference to the accompanying figures. Embodiments are provided for illustrative purposes and other embodiments that are not explicitly illustrated or described are possible. Further, modifications can be made to embodiments of the present disclosure that will be described below in detail.

Figure 4:
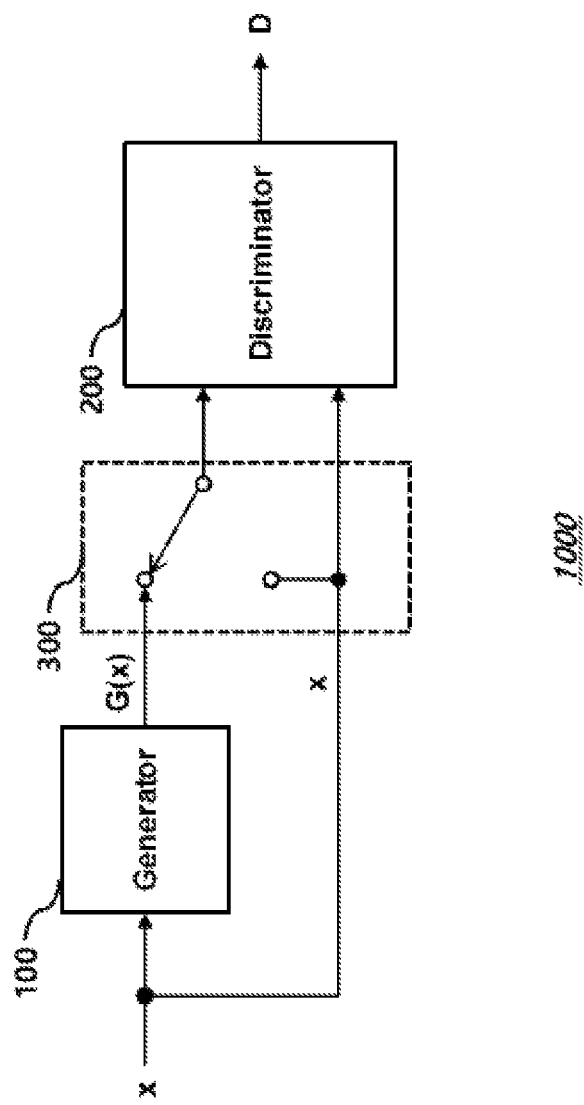
FIG. 4 is a block diagram showing a novelty detector according to an embodiment of the present disclosure.

FIG. 4 is a block diagram showing a novelty detector 1000 according to an embodiment of the present disclosure.

The novelty detector 1000 includes a generator 100 and a discriminator 200.

Each of the generator 100 and the discriminator 200 may include a neural network such as a convolutional neural network (CNN).

Figure 2:
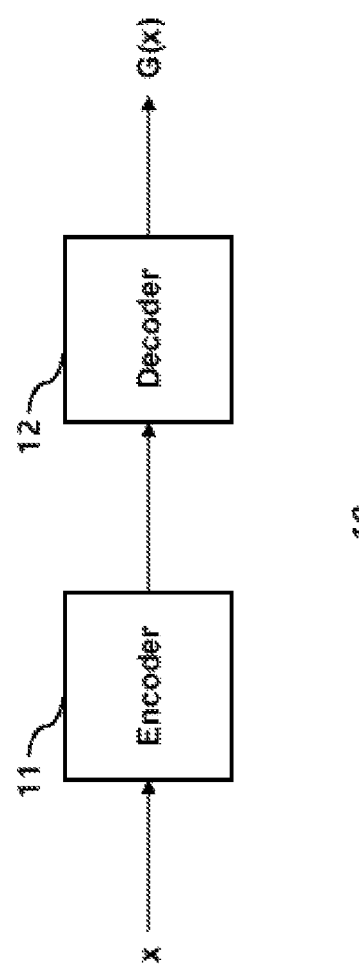
FIG. 2 is a block diagram showing a conventional generator.

The generator 100 receives actual data x and generates reconstructed data G(x), and may include an encoder and a decoder therein such as shown in FIG. 2, wherein each of the encoder and the decoder may have a neural network structure such as a CNN.

Hereinafter, actual data x may be referred to as input data x.

Unlike the prior art, the discriminator 200 receives the reconstructed data G(x) as well as the actual data x at the same time during an inference process and outputs the discrimination data D.

In the present embodiment, the discrimination data D has a value ranging from 0 to 1, and when the actual data x is a normal sample, it has a larger value than that corresponding to an abnormal sample. In an embodiment, a higher value of the discrimination data D may correspond to an increased likelihood or confidence that the actual data x is a normal sample.

The novelty detector 1000 may further include a coupling circuit 300.

The coupling circuit 300 provides a first pair of the actual data x and the actual data x or a second pair of the actual data x and the reconstructed data G(x) as inputs of the discriminator 200 during a training operation.

For example, during the training operation, the first pair (x, x) and the second pair (x, G(x)) may be alternately provided as inputs of the discriminator 200.

The coupling circuit 300 simultaneously provides the actual data x and the reconstructed data G(x) as inputs of the discriminator 200 during an inference process.

Figure 7:
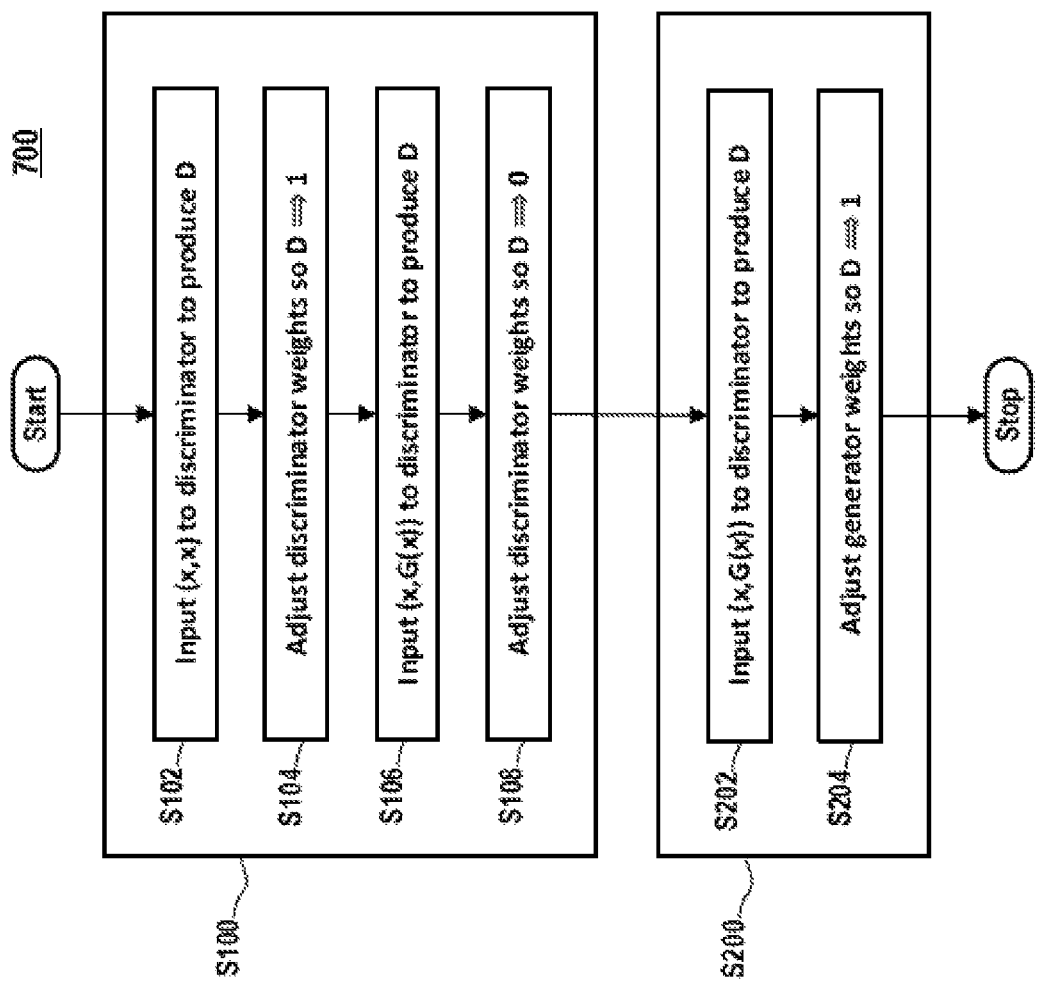
FIG. 7 is a flowchart showing a training process of the novelty detector of FIG. 4 according to an embodiment.

FIG. 7 is a flowchart illustrating a training operation 700 of the novelty detector 1000.

In the present embodiment, the discriminator 200 and the generator 100 are alternately trained.

During a training operation of the discriminator 200 at step S100, weights of the discriminator 200 are adjusted while weights of the generator 100 are fixed.

During a training operation of the discriminator 200, the first pair (x, x) or the second pair (x, G(x)) are alternately input to the discriminator 200.

In an embodiment of step S100, at step S102, the first pair (x, x) is input to the discriminator 200 to produce discrimination data D. At step S104, weights of the discriminator 200 are adjusted so that the discrimination data D tends towards 1 when the first pair (x, x) is input. At step S106, actual data x is input to the generator 100 to produce generated reconstructed data G(X) and the second pair (x, G(x)) is input to the discriminator 200 to produce discrimination data D. At step S108, the weights of the discriminator 200 are adjusted so that the discrimination data D tends towards 0 when the second pair (x, G(x)) is input. That is, to adjust weights of the discriminator 200, a first value of the discrimination data D corresponding to the first pair (x, x) and a second value of the discrimination data D corresponding to the second pair (x, G(x)) are both considered.

During a training operation 700 of the generator 100 at step S200, weights of the generator 100 are adjusted while weights of the discriminator 200 are fixed.

In step S200, at step S202 the actual data x is provided to the generator 100 to produce the reconstructed data G(x), and the actual data x and the reconstructed data G(x) are input to the discriminator 200 at the same time. That is, only the second pair (x, G(x)) is input to the discriminator 200.

At step S204, based on the actual data x and the reconstructed data G(x) being input, weights of the generator 100 are adjusted so that the discrimination data D tends towards 1. In the present embodiment, mean square error between the actual data x and the reconstructed data G(x) is not considered to train the generator 100.

In the training operation 700, the discriminator 200 and the generator 100 may be trained by alternately repeating steps S100 and S200.

In the conventional novelty detector 1, the discriminator 20 only receives the reconstructed data G(x) without receiving the actual data x, and distinguishes between a normal sample and an abnormal sample.

In contrast, in the novelty detector 1000 according to the present embodiment, the discriminator 200 receives the actual data x and the reconstructed data (G(x)) at the same time.

Novelty detection performance when a test sample unused during a training operation is input during an inference process may be represented with generalization error.

When using a GAN structure, we would like the generator to reconstruct well when normal samples come in, and the generator to reconstruct badly when abnormal samples come in. This means that the generator is not generalized or generalization of the generator is bad. On the other hand, we would like the discriminator to discriminate well regardless of normal or abnormal samples, which means the generalization of the discriminator is good.

In a conventional GAN, it is difficult to make the generalization error of the discriminator and the generator differently. For instance, a good generalization of the discriminator will lead to a good generalization of the generator, and vice versa.

However, in an embodiment, the generalization performance of the generator and the discriminator can be set differently by using two discriminators. In this embodiment, the generalization error of the generator may be regarded as the same as the reconstruction error and the generalization performance of the generator may be regarded as the same as the reconstruction performance. The generalization performance is improved as the generalization error becomes small.

The generator 100 should have good reconstruction performance for normal samples, that is small reconstruction error, and poor reconstruction performance for abnormal samples, that is large reconstruction error, to improve overall novelty detection performance. As the generalization performance of the discriminator 200 is improved, the generalization performance of the generator 100 for the abnormal sample is also improved, and the overall novelty detection performance may be limited.

Figure 5:
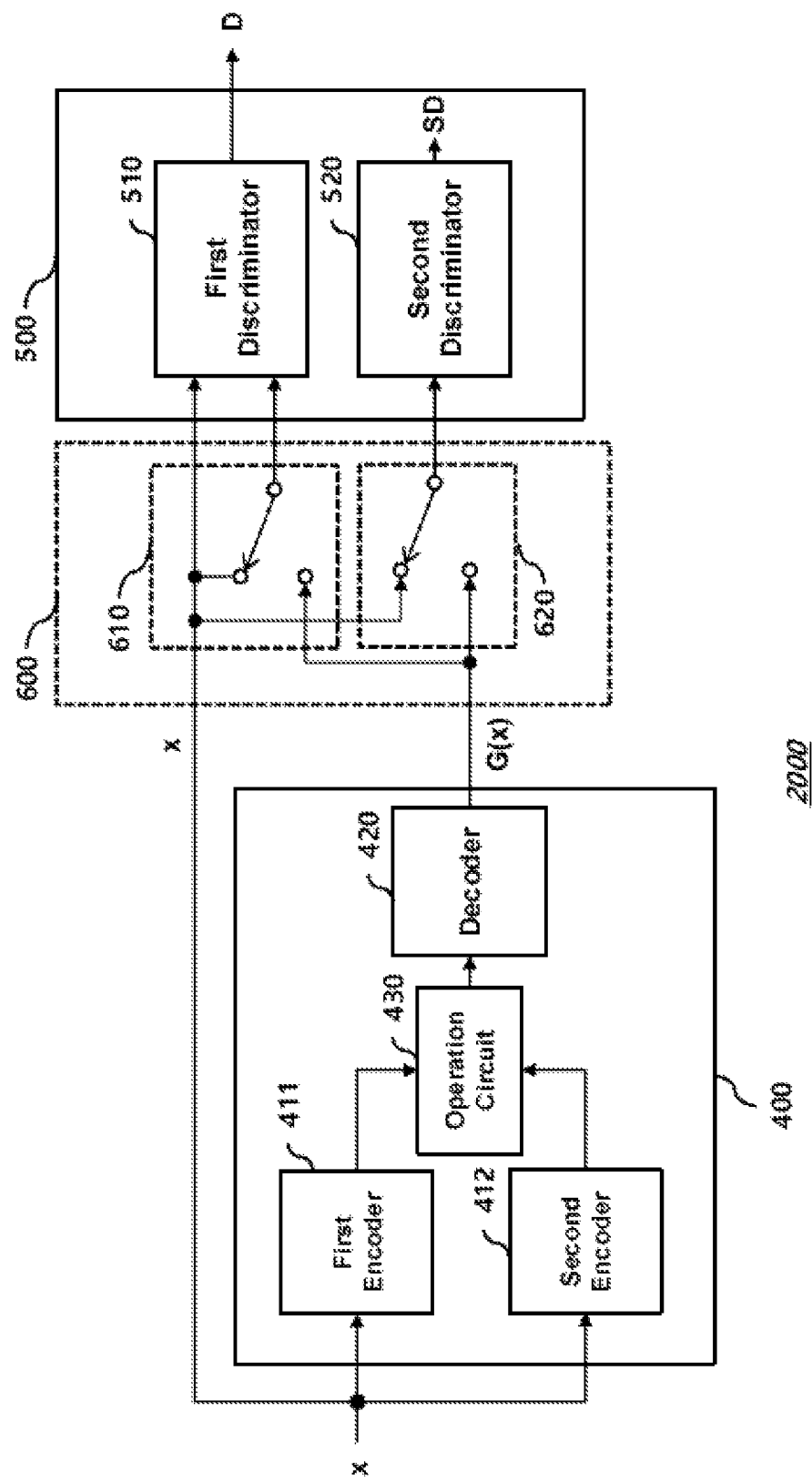
FIG. 5 is a block diagram showing a novelty detector according to another embodiment of the present disclosure.

In the embodiment of FIG. 5, improvement of the generalization performance of the generator may be suppressed while improving the generalization performance of the discriminator. Thereby, the generalization performance of the discriminator and the generalization performance of the generator may be set differently.

FIG. 5 is a block diagram showing a novelty detector 2000 according to another embodiment of the present disclosure.

The novelty detector 2000 includes a generator 400 and a discriminator 500.

The generator 400 includes a first encoder 411, a second encoder 412, an operation circuit 430, and a decoder 420.

The first encoder 411 and the second encoder 412 encode actual data x, respectively.

Figure 1:
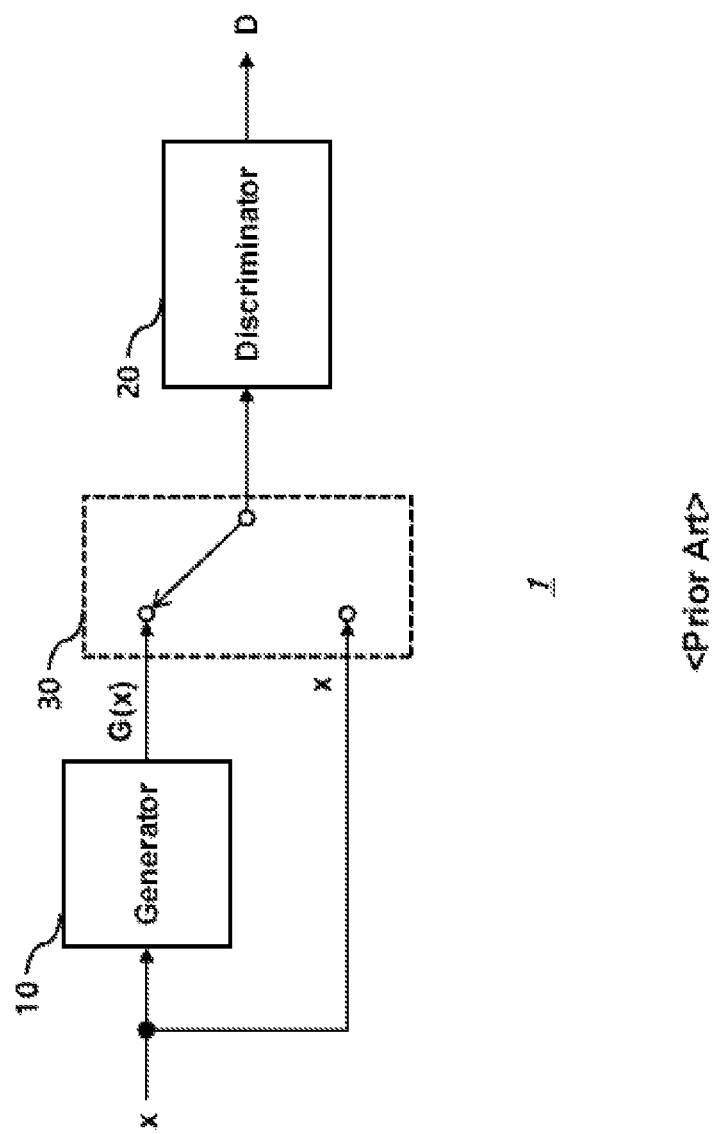
FIG. 1 is a block diagram showing a conventional novelty detector.

The first encoder 411 corresponds to an encoder included in the generator 100 of FIG. 4, and the second encoder 412 corresponds to an encoder included in the generator 10 of FIG. 1.

This will be disclosed in detail while explaining a training operation.

The operation circuit 430 combines the outputs of the first encoder 411 and the second encoder 412. For example, the operation circuit 430 may linearly combine the outputs from the first encoder 411 and the second encoder 412 with normalization.

The decoder 420 decodes the output of the operation circuit 430 and outputs reconstructed data G(x).

Each of the first encoder 411, the second encoder 412, and the decoder 420 may include a neural network such as a CNN.

The discriminator 500 receives the actual data x and the reconstructed data G(x) and outputs the discrimination data D.

For example, the discrimination data D has a value from 0 to 1. The discrimination data D has a larger value when the actual data x is a normal sample.

The discriminator 500 includes a first discriminator 510 and a second discriminator 520.

The first discriminator 510 is substantially the same as the discriminator 200 of FIG. 4 and the second discriminator 520 is substantially the same as the discriminator 20 of FIG. 1.

The first discriminator 510 receives the actual data x and the reconstructed data G(x) at the same time during an inference operation and outputs the discrimination data D.

The discrimination data D output from the first discriminator 510 may be referred to as first discrimination data.

The discrimination data SD output from the second discriminator 520 is used only in the training operation and not used in the inference operation.

The discrimination data SD output from the second discriminator 520 may be referred to as the second discrimination data SD.

Accordingly, the second discriminator 520 may be turned off during the inference operation to reduce power consumption.

The novelty detector 2000 further includes a coupling circuit 600.

The coupling circuit 600 includes a first coupling circuit 610 and a second coupling circuit 620.

The first coupling circuit 610 corresponds to the coupling circuit 300 of FIG. 4 and the second coupling circuit 620 corresponds to the coupling circuit 30 of FIG. 1.

The first coupling circuit 610 simultaneously provides the actual data x and the reconstructed data G(x) to the first discriminator 510 in the inference operation.

The first coupling circuit 610 alternately provides the first pair (x, x) or the second pair (x, G(x)) to the first discriminator 510 in the training operation of the first discriminator 510 and provides the second pair (x, G(x)) to the first discriminator 510 in the training operation of the first encoder 411 or the decoder 420.

The second coupling circuit 620 alternately provides the actual data x or the reconstructed data G(x) to the second discriminator 520 in the training operation of the second discriminator 520 and provides the reconstructed data G(x) to the second discriminator 520 in the training operation of the second encoder 412 or the decoder 420.

Since the second discriminator 520 does not operate during the inference operation, the second coupling circuit 610 may have any state during the inference operation.

Figure 8:
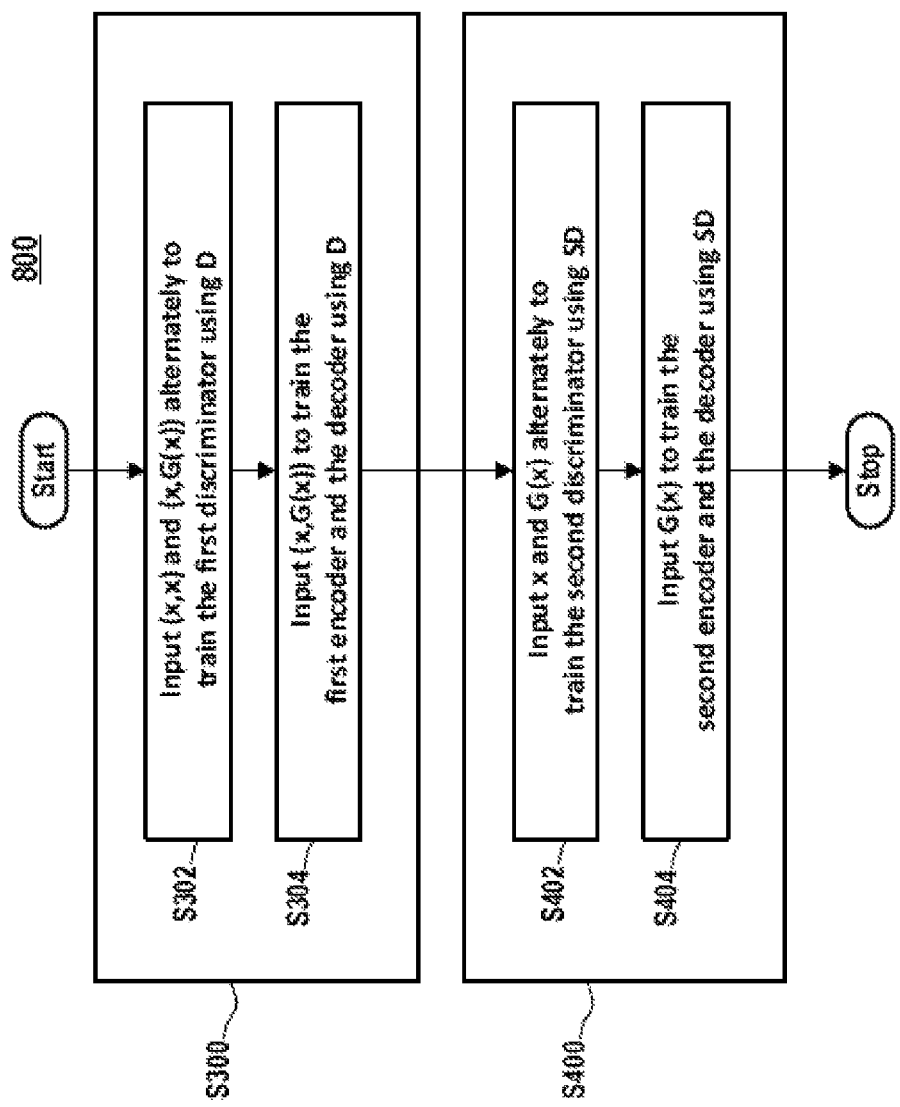
FIG. 8 is a flowchart showing a training process of the novelty detector of FIG. 5 according to an embodiment.

FIG. 8 is a flowchart showing a training process 800 of the novelty detector 2000.

First, the first discriminator 510, the first encoder 411, and the decoder 420 are sequentially trained at step S300.

In step S300, at step S302 the first coupling circuit 610 operates to alternately provide the first pair (x, x) and the second pair (x, G(x)) to the first discriminator 510 in the training operation of the first discriminator 510, and at step S304 the first coupling circuit 610 operates to provide the second pair (x, G(x)) to the first discriminator 510 in the training operation of the first encoder 411 and the decoder 420.

This is an operation corresponding to the flowchart of FIG. 7.

That is, the training operation of the first discriminator 510 in step S302 corresponds to the step S100 in FIG. 7, and the training operation of the first encoder 411 and decoder 420 in step S304 corresponds to the step S200 in FIG. 7.

Next, the second discriminator 520, the second encoder 412, and the decoder 420 are sequentially trained at step S400.

In step S400, at step S402 the second coupling circuit 620 operates so that the actual data x and the reconstructed data G(x) are alternately provided to the second discriminator 520 in the training operation of the second discriminator 520 and the second discriminator 520 is trained using the second discriminator output SD, at step S404 the second coupling circuit 620 operates so that the reconstructed data G(x) is provided to the second discriminator 520 in the training operation of the second encoder 412 and the decoder 420 using the second discriminator output SD.

Figure 3:
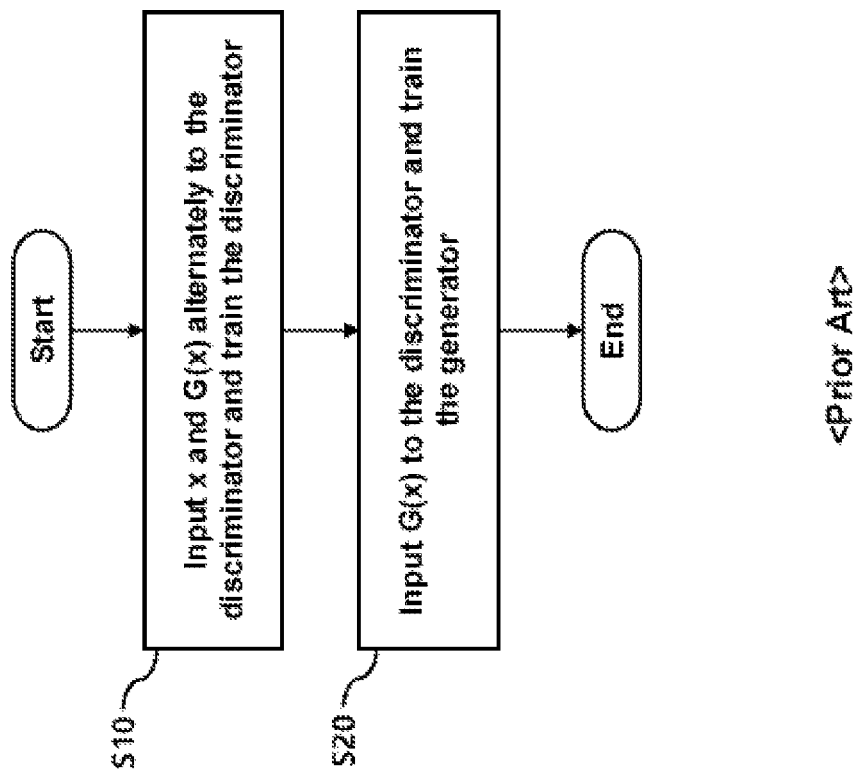
FIG. 3 is a flowchart showing a training operation of a conventional novelty detector.

This is an operation corresponding to the flowchart of FIG. 3.

That is, the training operation of the second discriminator 520 in step S402 corresponds to the step S10 in FIG. 3, and the training operation of the second encoder 412 and decoder 420 in step S404 corresponds to step S20 in FIG. 3.

As described above, since the first encoder 411 is trained using the first discriminator 510 according to the present embodiment, the generalization error is relatively smaller than that of the second encoder 412. Since the second encoder 412 is trained using the second discriminator 520 according to the prior art, the generalization error will tend to be larger than that of the first encoder 411.

In the embodiment of FIG. 5, the generator 400 operates by using outputs of the first encoder 411 and the second encoder 412 together, so that the overall generalization error of the generator 400 is larger than the generalization error of the generator 100 of FIG. 4.

Since the novelty detector 2000 of FIG. 5 operates using the generator 400 and the first discriminator 510 during the inference operation, the generalization error of the first discriminator 510 may be kept to a level corresponding to that of the discriminator 200 of FIG. 4 and the generalization error of the generator 400 may be increased to a level larger than that of the generator 100 of FIG. 4, thereby improving overall novelty detection performance.

That is, unlike the embodiment in FIG. 4, in the novelty detector 2000 of FIG. 5, the generalization error of the generator 400 and the generalization error of the discriminator 500 may be set differently, thereby further improving the novelty detection performance.

Figure 9:
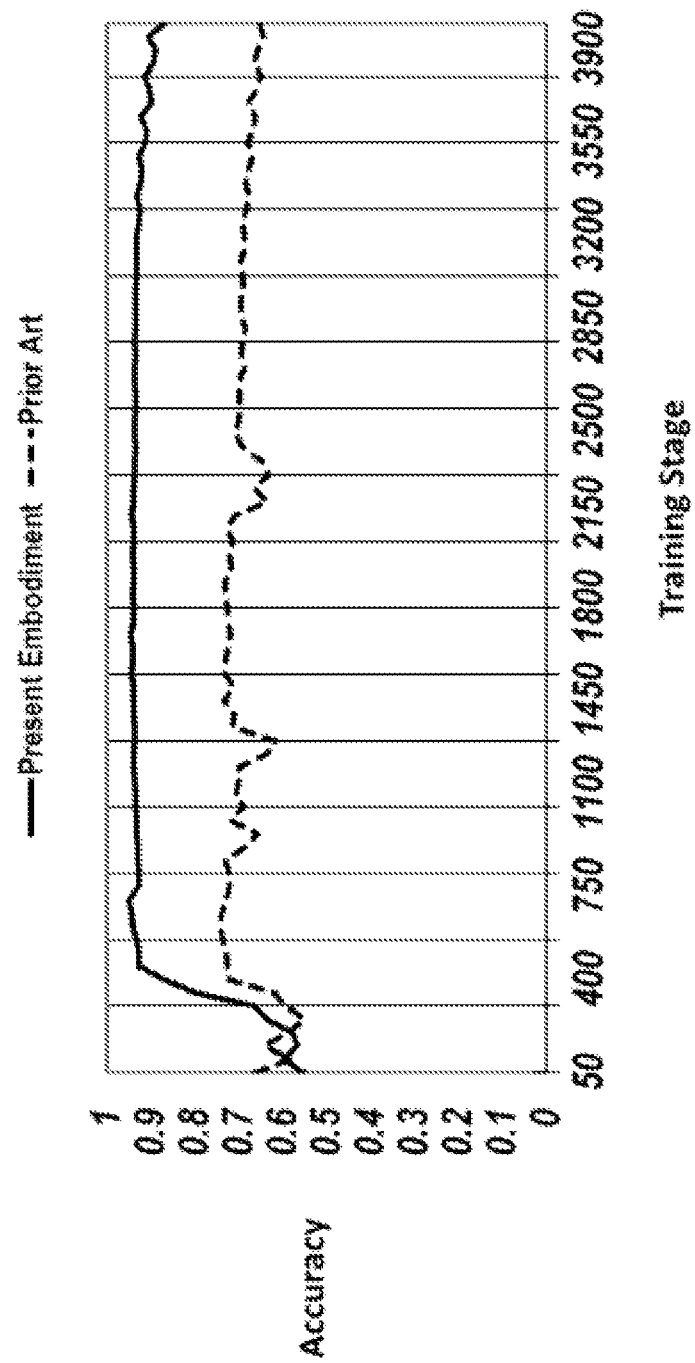
FIG. 9 is a graph showing an effect of an embodiment of the present disclosure.

FIG. 9 is a graph showing an effect of the present embodiment.

The graph shows accuracy of each compared novelty detectors when 5 normal samples and 5 abnormal samples are input thereto. The novelty detectors in FIG. 9 were trained with Modified National Institute of Standards and Technology (MNIST) data set, which is a handwriting data set.

The horizontal axis represents number of training stages performed during the training operation.

As shown in the graph, when a sufficient number of training stages or more are performed during the training operation (for example, when 600 or more training stages are performed), the overall accuracy was measured to be higher in the present embodiment.

Figure 6:
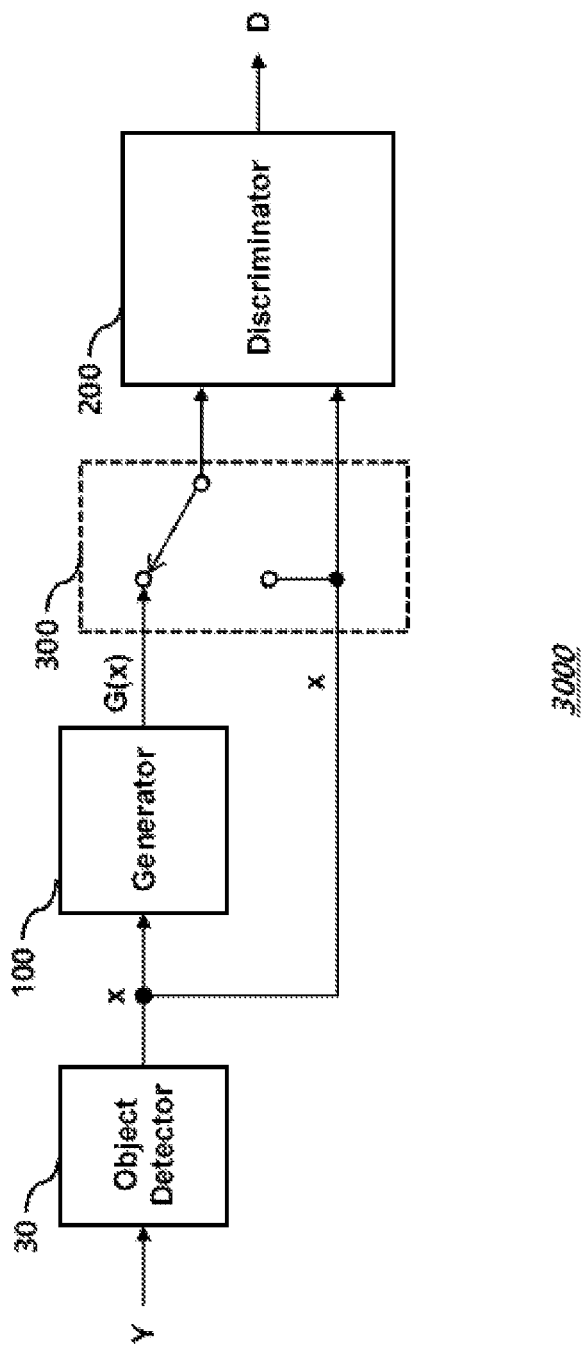
FIG. 6 is a block diagram showing a novelty detector according to another embodiment of the present disclosure.

FIG. 6 is a block diagram showing a novelty detector 3000 according to another embodiment of the present disclosure.

In FIG. 6, the novelty detector 3000 is different from the novelty detector 1000 in that the novelty detector 3000 further includes an object detector 30. In the embodiment shown in FIG. 6, the generator 100, discriminator 200, and coupling circuit 300 of FIG. 4 are used, but embodiments are not limited thereto; for example, in another embodiment, the generator 400, discriminator 500, and coupling circuit 600 of FIG. 5 could be used instead.

The output data of the object detector 30 corresponds to the actual data x.

The object detector 30 may extract feature data from the input image Y, for example.

The object detector 30 may include of a neural network trained in advance, which is well known in the related art, so a detailed description thereof will be omitted.

Embodiments of the present disclosure may be implemented using electronic circuits, optical circuits, one or more processors executing software or firmware stored in a non-transitory computer-readable medium, or a combination thereof. The electronic circuits or optical circuits may include circuits configured to perform neural network processing. The one or more processors may include a central processing unit (CPU), a graphics processing units (GPU), or combinations thereof.

Although various embodiments have been described for illustrative purposes, various changes and modifications may be possible.

What is claimed is:

1. A novelty detecting device comprising:
a generator configured to output reconstructed data from actual data;
a discriminator configured to receive the actual data and the reconstructed data and to produce, using the actual data and the reconstructed data, discrimination data representing whether the actual data is normal or abnormal; and
a coupling circuit configured to:
provide the actual data and the reconstructed data to the discriminator at the same time during an inference operation,
provide a first pair including two copies of the actual data during a first step of a training operation, and
provide a second pair including the actual data and the reconstructed data to the discriminator during a second step and a third step of the training operation.

2. The novelty detecting device of claim 1, wherein the generator includes an encoder for encoding the actual data and a decoder to output the reconstructed data by decoding an output from the encoder.

3. The novelty detecting device of claim 1, wherein each of the generator and the discriminator includes a neural network.

4. The novelty detecting device of claim 3, wherein weights of the generator are adjusted while weights of the discriminator are fixed during the third step of the training operation.

5. The novelty detecting device of claim 3, wherein weights of the discriminator are adjusted while weights of the generator are fixed during the first and second steps of the training operation.

6. The novelty detecting device of claim 1, further comprising an object detector configured to extract the actual data from received data.

7. The novelty detecting device of claim 1, wherein the generator includes:
a first encoder configured to encode the actual data;
a second encoder configured to encode the actual data; and
a decoder configured to generate the reconstructed data according to an output of the first encoder and an output of the second encoder.

8. The novelty detecting device of claim 7, further comprising an operation circuit to combine the outputs of the first encoder and the second encoder and provide the combined outputs to the decoder.

9. The novelty detecting device of claim 7, wherein the discriminator includes:
a first discriminator configured to receive the actual data and the reconstructed data at the same time, to generate first discrimination data according to the actual data and the reconstructed data, and to provide the first discrimination data as the discrimination data; and
a second discriminator configured to receive the actual data or the reconstructed data and to generate second discrimination data according to the data received.

10. The novelty detecting device of claim 9, wherein each of the first encoder, the decoder, and the first discriminator includes a neural network.

11. The novelty detecting device of claim 10, further comprising a first coupling circuit configured to:
provide the actual data and the reconstructed data to the first discriminator at the same time during an inference operation;
provide a first pair including two copies of the actual data during a first step of a training operation, and
provide a second pair of the actual data and the reconstructed data to the first discriminator during a second step and a third step of the training operation.

12. The novelty detecting device of claim 11, wherein weights of the first encoder or the decoder are adjusted while weights of the first discriminator are fixed during the third step of the training operation.

13. The novelty detecting device of claim 12, wherein weights of the first discriminator are adjusted while weights of the first encoder and the decoder are fixed during the first and second steps of the training operation.

14. The novelty detecting device of claim 10, wherein each of the second encoder, the decoder, and the second discriminator includes a neural network.

15. The novelty detecting device of claim 14, further comprising a second coupling circuit configured to:
 provide the actual data to the second discriminator during a fourth step of a training operation; and
 provide the reconstructed data to the second discriminator during a fifth step and a sixth step of the training operation.

16. The novelty detecting device of claim 15, wherein weights of the second encoder or the decoder are adjusted while weights of the second discriminator are fixed during the sixth step of the training operation.

17. The novelty detecting device of claim 15, wherein weights of the second discriminator are adjusted while weights of the second encoder and the decoder are fixed during the fourth and fifth steps of the training operation.

\* \* \* \* \*